(12) United States Patent
Chavarria

(10) Patent No.: US 7,489,236 B2
(45) Date of Patent: Feb. 10, 2009

(54) PEDESTRIAN ALERT SYSTEM FOR VEHICLES

(76) Inventor: Faustino V. Chavarria, 1522 Antelope Dr., Salinas, CA (US) 93905

( * ) Notice: Subject to any disclaimer, the term of this patent is extended or adjusted under 35 U.S.C. 154(b) by 125 days.

(21) Appl. No.: 11/413,412

(22) Filed: Apr. 28, 2006

(65) Prior Publication Data

US 2006/0244635 A1    Nov. 2, 2006

(51) Int. Cl.
*B60Q 1/26* (2006.01)
(52) U.S. Cl. .................. 340/468; 340/901; 340/944; 701/9; 382/103; 382/195
(58) Field of Classification Search .......... 340/468, 340/901, 944; 701/9; 382/103, 195
See application file for complete search history.

(56) References Cited

U.S. PATENT DOCUMENTS

| 5,905,434 | A  | * | 5/1999 | Steffan et al. ............... 340/464 |
| 6,707,391 | B1 | * | 3/2004 | Monroe ...................... 340/901 |
| 2003/0083790 | A1 | * | 5/2003 | Hattori et al. .................. 701/1 |
| 2005/0201590 | A1 | * | 9/2005 | Kudo ......................... 382/103 |

* cited by examiner

*Primary Examiner*—Jeff Hofsass
*Assistant Examiner*—Sisay Yacob
(74) *Attorney, Agent, or Firm*—Central Coast Patent Agency, Inc.

(57) ABSTRACT

A pedestrian alert system has a manual input mechanism accessible to a person in a first vehicle, and an alert-generating apparatus associated with the first vehicle. The system is characterized in that triggering the input mechanism causes an alert to be issued regarding presence of a pedestrian in a crosswalk. Alerts may be either audio or visual, or both, and may be directed to a person in a second vehicle behind the first.

8 Claims, 5 Drawing Sheets

PEDESTRIAN ALERT SYSTEM FOR VEHICLES

CROSS-REFERENCE TO RELATED APPLICATIONS (Not Applicable)

BACKGROUND OF THE INVENTION

1. Field of the Invention

The present invention is in the area of warning and alert systems for road-capable vehicles, such as automobiles and trucks, and pertains more particularly to a system for warning operators of other vehicles of danger to pedestrians that may not be seen.

2. Discussion of the State of the Art

It is well-known that many roadways in most all countries often have more than one traffic lane in the same direction. Further, it is well-known that, particularly in cities and towns, there are pedestrian crossings (crosswalks), some with automated signals, and some with no signals at all.

At pedestrian crossings where there exist more than one lane of traffic in one direction, there also exists a particular hazard for drivers and pedestrians, the hazard being that with one driver stopped in one lane with a pedestrian in the crosswalk, sight of the pedestrian may be obscured for another driver in another or an adjacent lane by the vehicle of the first driver. There have been many accidents as a result, with a pedestrian, or even a group of pedestrians injured or killed because a driver of a moving vehicle in a lane other than the lane occupied by a stopped vehicle does not discern the pedestrian or pedestrians who may suddenly appear in front of his moving vehicle.

What is clearly needed is a system with an audio or preferably a visual alert or alerts that can be operated at need by a driver of a vehicle, so if a stopped vehicle notices a moving pedestrian in a crosswalk in front of his or her vehicle, that driver can trigger an alert to drivers of vehicles in other lanes proceeding in the same direction.

SUMMARY OF THE INVENTION

In an embodiment of the invention a pedestrian alert system is provided, comprising a manual input mechanism accessible to a person in a first vehicle, and an alert-generating apparatus associated with the first vehicle, wherein triggering the input mechanism causes an alert to be issued to outside the first vehicle regarding presence of a pedestrian in a crosswalk. In one embodiment the alert is directed to be audible or visible to a person in a second vehicle located to the rear of the first vehicle.

In some embodiments the alert issued is an audio signal, which may comprise recorded or simulated human speech regarding a pedestrian in a crosswalk. In some embodiments the alert issued is a visual alert, and may be a lamp signal having an iconic figure indicating a pedestrian.

In some embodiments the manual input mechanism may be a pushbutton or a switch mounted within the first vehicle in a position to be accessible to either an operator or a passenger in the vehicle. In some other embodiments the manual input mechanism comprises sensing a specific manipulation of an input dedicated to a different purpose, and triggering the alert input as a result of the specific manipulation.

In another aspect of the invention a method for warning of a pedestrian in a crosswalk is provided, comprising steps of (a) triggering a manual input mechanism accessible to a person in a first vehicle; and (b) issuing an audible or visual alert to outside the first vehicle by an alert-generating apparatus associated with the first vehicle as a result of the manual input. In some embodiments there may be a step for directing the alert to be audible or visible to a person in a second vehicle located to the rear of the first vehicle.

In some embodiments of the method in step (b) the alert issued is an audio signal, which may be recorded or simulated human speech regarding a pedestrian in a crosswalk. Also in some embodiments in step (b) the alert issued is a visual alert, and may comprise a lamp signal having an iconic figure indicating a pedestrian.

In some embodiments of the method the manual input mechanism may be a pushbutton or a switch mounted within the first vehicle in a position to be accessible to either an operator or a passenger in the vehicle, and in other embodiments the manual input mechanism may comprise sensing a specific manipulation of an input dedicated to a different purpose, and triggering the alert input as a result of the specific manipulation.

BRIEF DESCRIPTION OF THE DRAWING FIGURES

DETAILED DESCRIPTION

Figure 1:
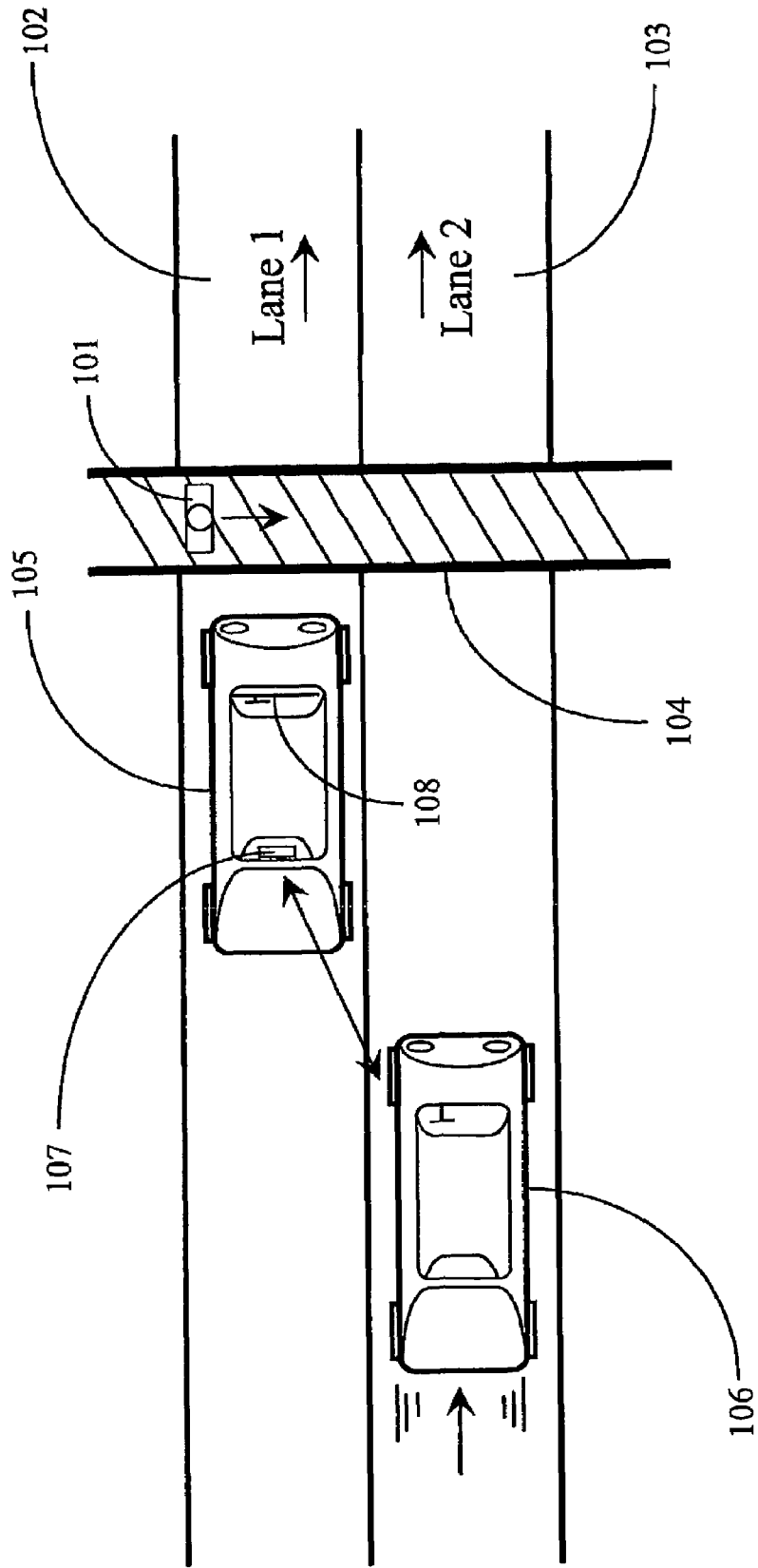
FIG. 1 is a plan view of a crosswalk in a dual-lane roadway with a stopped vehicle having an alert system according to an embodiment of the present invention.

FIG. 1 is a plan view of a crosswalk 104 in a dual-lane roadway having two lanes 102 (Lane 1) and 103 (Lane 2), reserved and marked for traffic in the same direction. A stopped vehicle 105 having an alert system according to an embodiment of the present invention is near the crosswalk, and a pedestrian is moving in the crosswalk immediately in front of vehicle 105, in clear view of the driver of vehicle 105. A moving vehicle 106 in lane 2 is positioned somewhat behind the position of stopped vehicle 105, and the driver of vehicle 106 cannot see pedestrian 101 because of the intervening position of vehicle 105. Also, the pedestrian cannot see vehicle 106 approaching, and the pedestrian may be walking fast, running, or looking somewhere other than at the possibility of an approaching vehicle in lane 2.

Given a few seconds in time, if the driver of vehicle 106 were to have no warning, vehicle 106 will be at crosswalk 104, still moving, and pedestrian 101 may be into the region of lane 2. There may well be not enough time for the driver of vehicle 106 to avoid hitting the pedestrian. Even if the pedestrian may still be avoided by such as sudden braking or swerving, another accident may be the result, because the vehicle suddenly braking may be struck by yet another vehicle behind, or may swerve into the stopped vehicle, for example.

In this particular example, however, vehicle 105 is fitted with a warning system that includes a manual activation mechanism, which may be a pushbutton, a switch, or other manual input mechanism, and a visual alert light 107 positioned, in this example, in the rear window of vehicle 105. The driver of vehicle 105, seeing the pedestrian, has initiated the manual input, and light 107, which has a brilliant red light coupled with the familiar pedestrian icon (not shown), is flashing rapidly as an alert for the driver of vehicle 106. Seeing the alert, the driver of approaching vehicle 106 has time to apply the brakes and make a smooth stop before entering crosswalk 104.

It is emphasized here that the vehicles and situation depicted and described with reference to FIG. 1 is exemplary only, and not limiting. For example, the manual input can be any one of several types, and the alert can also be done in a number of different ways. Other forms of alerts and other variables are described further below.

Figure 2:
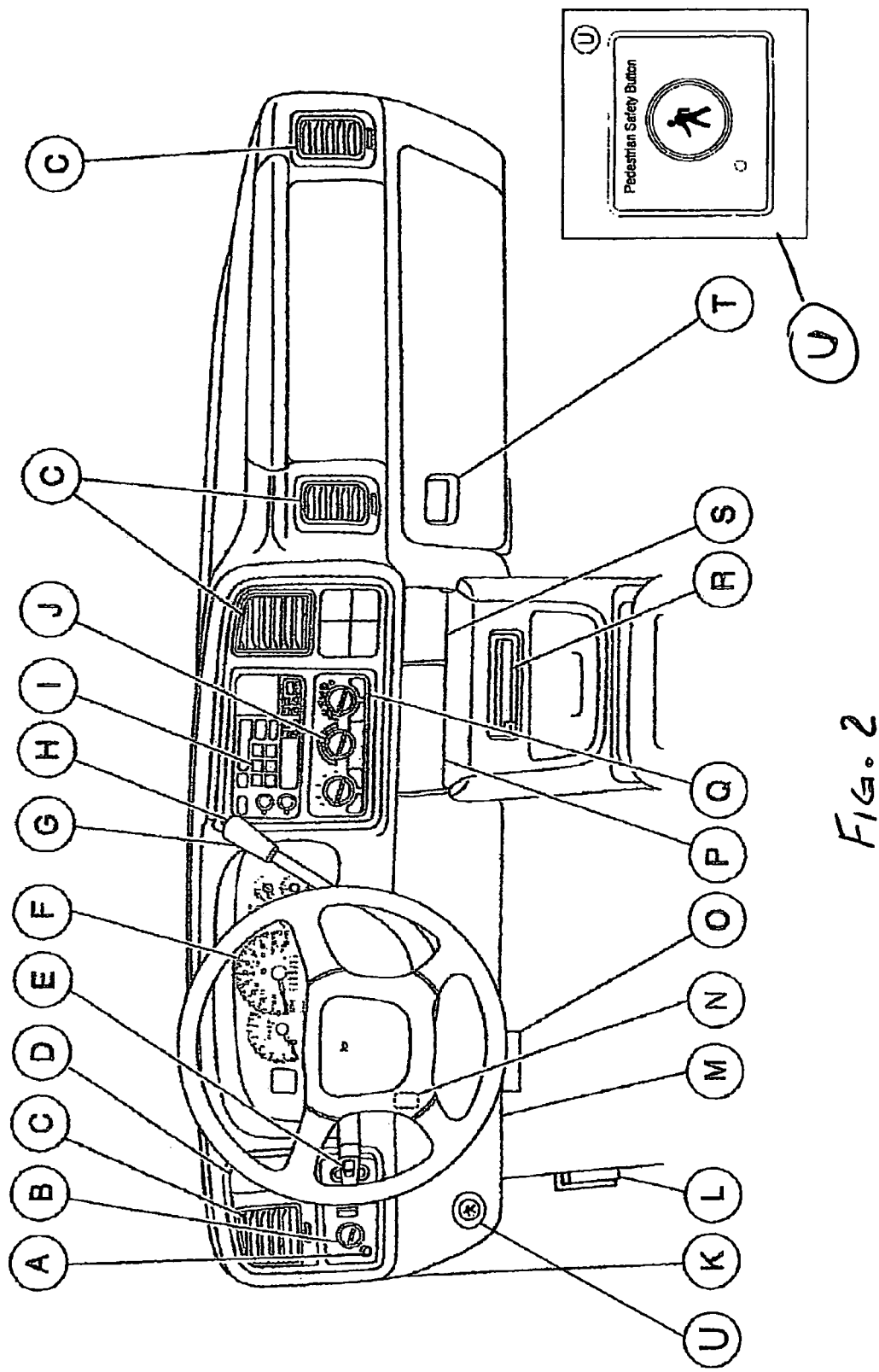
FIG. 2 is a view of a dashboard and related equipment in the stopped vehicle of FIG. 1, showing activation mechanisms.

FIG. 2 is a view of a dashboard and related equipment in stopped vehicle 105 of FIG. 1, showing an activation mechanism "U" labeled "Pedestrian Safety Button". This button may be located as shown on the dashboard of the vehicle, or may be elsewhere on the dashboard or may be integrated with other equipment. For example, there may be a foot switch on the driver's side on the floorboards to activate alert mechanism 107 or other alert. The manual input may also be on the center divider, or may be a pushbutton or switch on the steering wheel. Also, a vehicle may be enabled such that manipulation of an existing input in a particular way will activate the pedestrian alert. For example, an automobile might be set up so that varying the foot pressure on the brake pedal, such as a rapid variation, might trigger the alert. As another example, moving the turn signal lever up and down might trigger the alert. There are many possibilities. What is important is that there be a driver-accessible and operable input for triggering the alert.

Figure 3A:
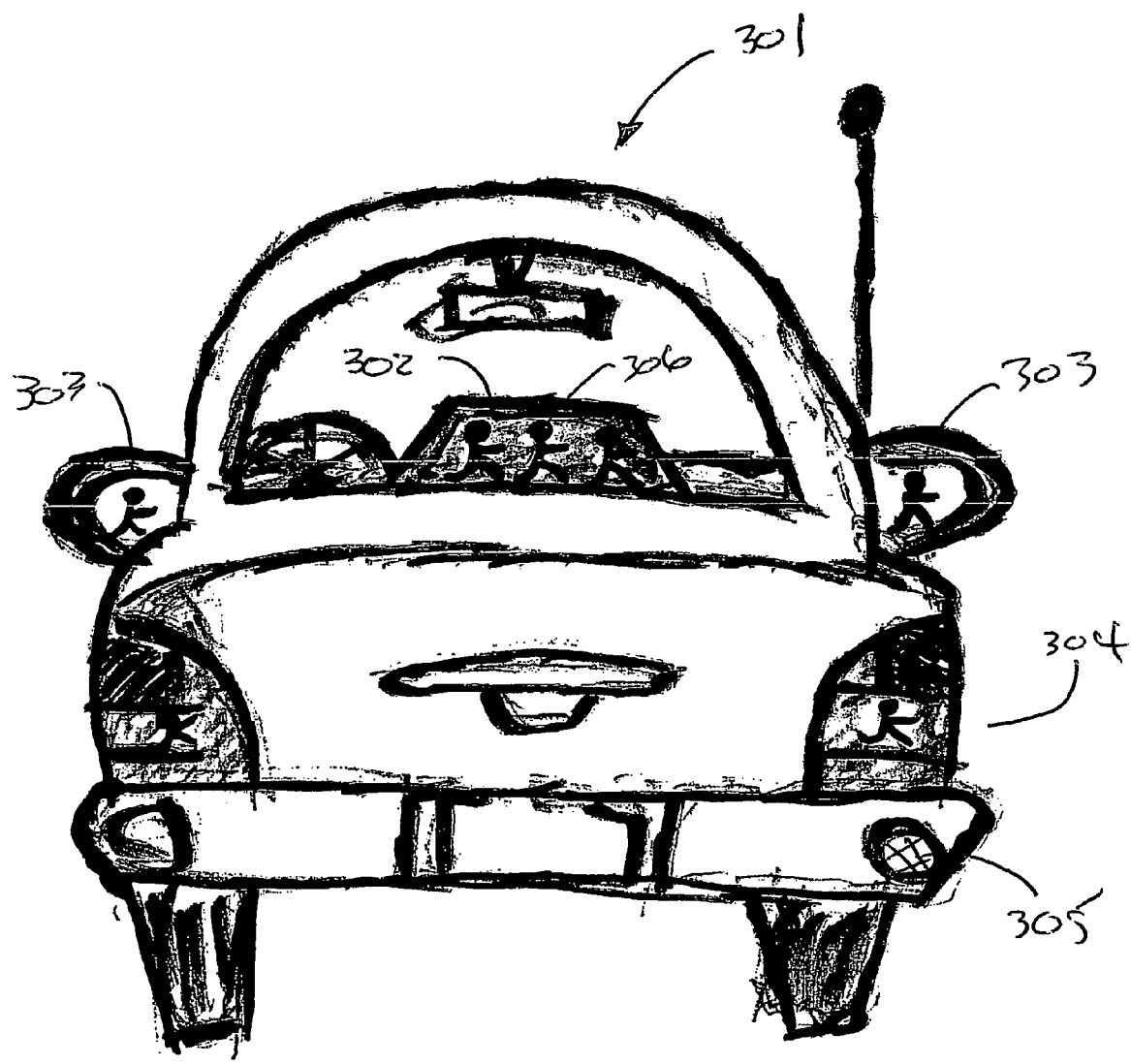
FIG. 3a is a view of an automobile from the rear illustrating visual and other alert mechanisms to be triggered by an activation mechanism like that of FIG. 2.

FIG. 3a is a view of an automobile from the rear illustrating visual and other alert mechanisms to be triggered by an activation mechanism like that of FIG. 2. Automobile 301 in FIG. 3 has a rear-window mounted visual display 302 having backlighted iconic FIGS. 306 indicating a pedestrian. When activated this display may light continuously in red, or in another vivid color to be understood as a pedestrian warning, and the pedestrian figures might be caused to move to indicate a moving pedestrian. Such a display might be original equipment manufacture (OEM), or might be an added after-market display. Wiring might be integrated with vehicle wiring, or an activation mechanism accessible to the driver might trigger action of the display by, for example an RF or other wireless signal. Display 301 may be powered by the vehicle electrical system, or might be battery powered.

Vehicle 301 also has displays mounted in the usual position for side-view mirrors. These display may be in addition to or instead of display 302, and may have the icon 306 as well, and can light in color and flash in some embodiments. Display of the pedestrian icon is also shown in the auto's tail lights, and this display may be enabled to operate entirely as normal tail lights and/or turn signals if the alert input mechanism is not activated, and the icon made to show only if the alert mechanism is activated.

There are many other ways a visual alert might be delivered for a following driver. A strobe light might be used for example, and caused to blink rapidly, or to otherwise move to attract attention. There are many possibilities.

In addition to the visual alerts shown, and other equivalents, there may be audio alerts as well. A speaker 305 in FIG. 3 is a speaker for delivering a shrill whistle, a siren, or a verbal warning ("Watch out for the pedestrian"). The audio alert can be in a wide variety of forms and formats.

Figure 3B:
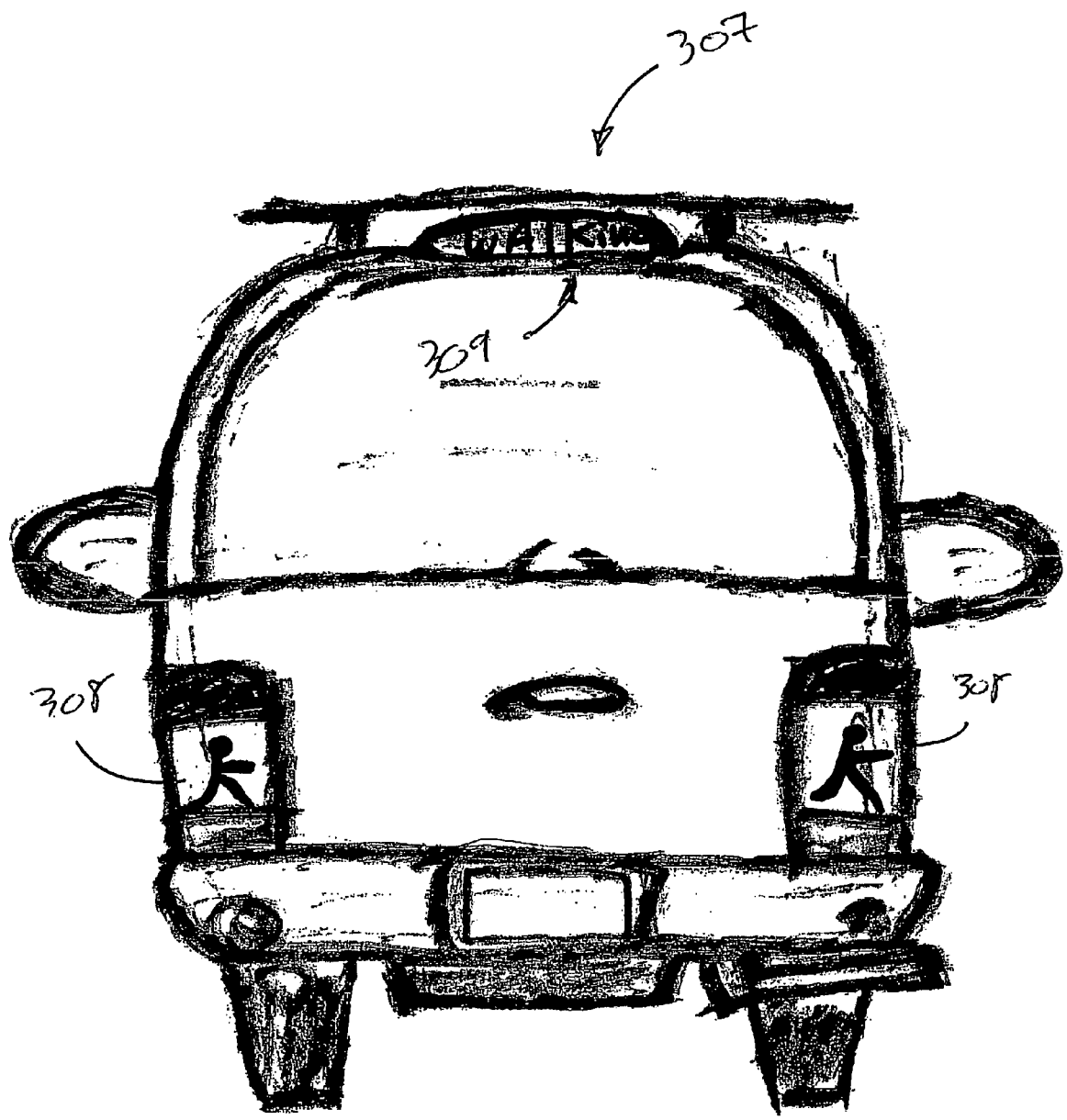
FIG. 3b is a view of a van from the rear illustrating visual and other alert mechanisms to be triggered by an activation mechanism like that of FIG. 2.

FIG. 3b is a rear view of a van 307 also having a warning system according to an embodiment of the present invention. In this example van 307 has enabled taillights 308 as in FIG. 3a, and also a display 309 with the word "Walking", which displays on activation of the alert mechanism by the driver of a stopped vehicle.

Figure 3C:
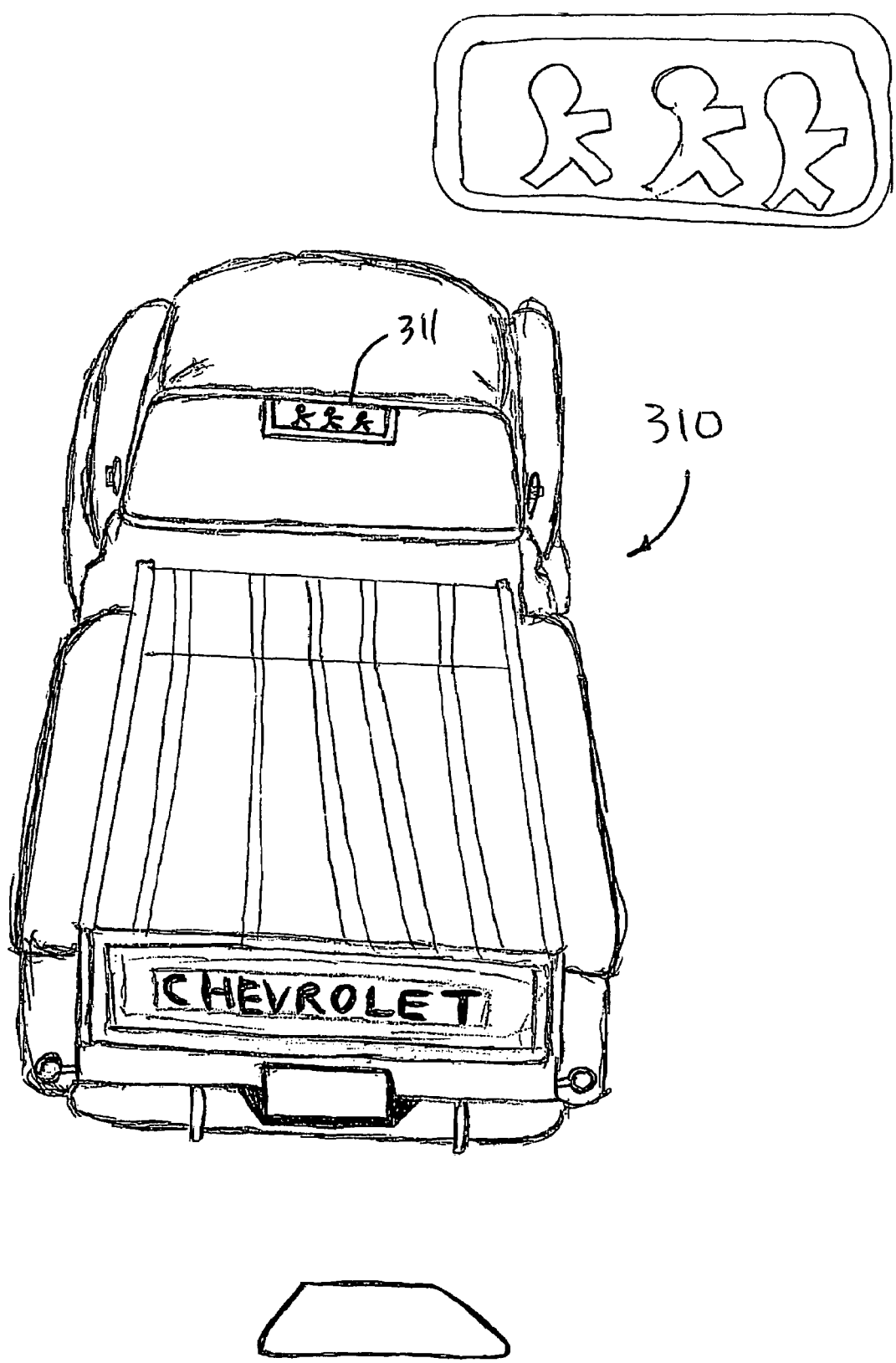
FIG. 3c is a view of a pickup truck from the rear illustrating visual and other alert mechanisms to be triggered by an activation mechanism like that of FIG. 2.

FIG. 3c is a view of a pickup truck 310 from the rear illustrating visual and other alert mechanisms to be triggered by an activation mechanism like that of FIG. 2. A display 311 similar to other displays shows in the rear window of the truck, and may be an aftermarket or an OEM device, as described above.

Large vehicles, such as semi-trailer trucks may be fitted with systems according to embodiments of the present invention, and all of the types of inputs and displays and audio alarms may be caused to be active on a towing vehicle or a towed vehicle, such as a semi trailer, or a utility trailer, in which case communication may be through a harness normally used to transmit stop, taillight, and turn signal operation from the towing vehicle to the trailer.

In another embodiment and aspect of the invention, both the stopped vehicle and the approaching vehicle (see FIG. 1) may have elements according to an embodiment of the present invention. In this situation, both vehicles may have been provided with a manual "pedestrian alert" input, such as a pushbutton on the dash; and both may have a recorded message that can be caused to play over the radio speakers of the vehicle. If one of the vehicles is stopped at a crosswalk, and there is a pedestrian in the crosswalk, and the driver activates the pushbutton, an RF or other wireless signal is sent to the following, moving vehicle, which causes a pre-programmed, recorded message to play, such as "Stop. Pedestrian in crosswalk". The message may, of course, vary in particulars. There may also be more than an audible message in the following, moving vehicle. There may also be a display or a flashing light, or other sort of visual indication in the following vehicle.

In other embodiments of the invention the alerts that might be generated are not confined to alerting drivers of vehicles approaching from the rear, but might alert drivers of vehicles approaching the crosswalk from any direction.

It will be apparent to a person with skill in the art that there may be many variations in the embodiments described within the spirit and scope of the invention. For this and other reasons, the invention is to be accorded the breadth of the appended claims.

What is claimed is:

1. A pedestrian alert system, comprising: a manual input mechanism accessible to a person in a first vehicle; and lamps displaying a pedestrian icon mounted on the first vehicle in different positions to be readily visible from varying locations behind the first vehicle; wherein triggering the input mechanism causes the lamps to be brilliantly lit, indicating to persons in one or more vehicles behind the first vehicle presence of a pedestrian in a crosswalk in front of the first vehicle.

2. The alert system of claim 1 wherein the manual input mechanism is a pushbutton or a switch mounted within the first vehicle in a position to be accessible to either an operator or a passenger in the vehicle.

3. The alert system of claim 1 wherein the manual input mechanism comprises sensing a specific manipulation of an input dedicated to a different purpose, and triggering the alert input as a result of the specific manipulation.

4. A method for warning of a pedestrian in a crosswalk, comprising the steps of: (a) triggering a manual input mechanism accessible to a person in a first vehicle; and (b) by the triggering in step (a), causing lamps displaying a pedestrian icon mounted on the first vehicle in different positions to be readily visible from varying locations behind the first vehicle to be brilliantly lit, indicating to persons in one or more vehicles behind the first vehicle, presence of a pedestrian in a crosswalk in front of the first vehicle.

5. The method of claim 4 wherein the manual input mechanism is a pushbutton or a switch mounted within the first vehicle in a position to be accessible to either an operator or a passenger in the vehicle.

6. The method of claim 4 wherein the manual input mechanism comprises sensing a specific manipulation of an input dedicated to a different purpose, and triggering the alert input as a result of the specific manipulation.

7. The alert system of claim 3 wherein the input dedicated to a different purpose is either a brake pedal or a turn-signal switch, and the specific manipulation comprises a repeated action imparted to the brake pedal of the turn-signal switch.

8. The method of claim 6 wherein the input dedicated to a different purpose is either a brake pedal or a turn-signal switch, and the specific manipulation comprises a repeated action imparted to the brake pedal of the turn-signal switch.

* * * * *